United States Patent
Russell et al.

(10) Patent No.: US 9,462,485 B2
(45) Date of Patent: Oct. 4, 2016

(54) NULL-DATA PACKET THROUGHPUT SYSTEM AND METHOD

(71) Applicant: Telefonaktiebolaget L M Ericsson (Publ), Stockholm (SE)

(72) Inventors: Michael Russell, Kanata (CA); Roland Smith, Nepean (CA)

(73) Assignee: Telefonaktiebolaget L M Ericsson, Stockholm (SE)

( * ) Notice: Subject to any disclaimer, the term of this patent is extended or adjusted under 35 U.S.C. 154(b) by 308 days.

(21) Appl. No.: 13/847,227

(22) Filed: Mar. 19, 2013

(65) Prior Publication Data

US 2013/0301441 A1 Nov. 14, 2013

Related U.S. Application Data

(60) Provisional application No. 61/612,962, filed on Mar. 19, 2012.

(51) Int. Cl.
| | |
|---|---|
| *H04L 12/28* | (2006.01) |
| *H04W 24/02* | (2009.01) |
| *H04W 24/06* | (2009.01) |
| *H04L 1/00* | (2006.01) |
| *H04W 24/08* | (2009.01) |
| *H04W 48/12* | (2009.01) |

(52) U.S. Cl.
CPC ............. *H04W 24/02* (2013.01); *H04L 1/00* (2013.01); *H04W 24/06* (2013.01); *H04W 24/08* (2013.01); *H04W 48/12* (2013.01)

(58) Field of Classification Search
CPC ... H04W 24/02; H04W 24/06; H04W 24/08; H04W 48/12
USPC .......................................... 370/392, 389, 474
See application file for complete search history.

(56) References Cited

U.S. PATENT DOCUMENTS

| | | | | |
|---|---|---|---|---|
| 7,804,762 | B2* | 9/2010 | Stephens et al. | 370/208 |
| 7,848,766 | B2* | 12/2010 | Ogino | H04W 64/00 455/456.1 |
| 8,401,018 | B2* | 3/2013 | Meylan et al. | 370/395.4 |
| 8,619,580 | B2* | 12/2013 | Park et al. | 370/236 |
| 8,743,784 | B2* | 6/2014 | Sampath et al. | 370/328 |
| 8,750,315 | B2* | 6/2014 | Dandekar | H04L 65/602 370/395.61 |

(Continued)

FOREIGN PATENT DOCUMENTS

EP 1335545 A1 8/2003

OTHER PUBLICATIONS

Bit error rate from Wikipedia, last modified on Mar. 14, 2013 and retrieved from <http://en.wikipedia.org/w/index.php?title=Bit_error_rate&oldid=544162177> on Mar. 19, 2013.

(Continued)

*Primary Examiner* — Phuc Tran
(74) *Attorney, Agent, or Firm* — Katten Muchin Rosenman LLP

(57) ABSTRACT

A system and method for improving signal reception in an access point. The system and method may comprise the steps of: transmitting a non-zero 802.11 NULL-data packet to a client, wherein the traffic test is initiated at intervals; receiving an 802.11 ACKnowledgement packet from the client wherein the 802.11 ACKnowledgement packet indicates that the non-zero 802.11 NULL-data packet was received by the client; and discarding the non-zero 802.11 NULL-data packet after receipt.

21 Claims, 12 Drawing Sheets

(56) References Cited

U.S. PATENT DOCUMENTS

| | | | |
|---|---|---|---|
| 2004/0086000 A1* | 5/2004 | Wallace | H04L 12/40019 370/503 |
| 2004/0136339 A1* | 7/2004 | Wentink | 370/329 |
| 2005/0220215 A1* | 10/2005 | Tanabe | H04B 7/0697 375/295 |
| 2006/0153148 A1* | 7/2006 | Bichot | H04H 20/42 370/338 |
| 2008/0025259 A1 | 1/2008 | Ponnuswamy et al. | |
| 2008/0123606 A1* | 5/2008 | Takizawa | H04W 74/0875 370/338 |
| 2008/0240055 A1* | 10/2008 | Dean | H04W 48/12 370/338 |
| 2009/0252145 A1* | 10/2009 | Meylan et al. | 370/348 |
| 2010/0189122 A1* | 7/2010 | Dandekar | H04L 65/602 370/412 |
| 2010/0189126 A1* | 7/2010 | Lurie et al. | 370/445 |
| 2010/0220601 A1* | 9/2010 | Vermani et al. | 370/248 |
| 2010/0232318 A1* | 9/2010 | Sarkar | 370/254 |
| 2011/0162060 A1* | 6/2011 | Vijayakumar et al. | 726/13 |
| 2011/0213905 A1* | 9/2011 | Wallace | H04L 12/40019 710/61 |
| 2011/0243110 A1* | 10/2011 | Dean | H04W 48/12 370/336 |
| 2012/0026909 A1 | 2/2012 | Seok | |
| 2012/0033614 A1* | 2/2012 | Sampath et al. | 370/328 |

OTHER PUBLICATIONS

Carrier Wi-Fi—Ericsson, retrieved from <http://www.ericsson.com/ourportfolio/products/carrier-wi-fi> on Mar. 18, 2013.

Latency (engineering) from Wikipedia, last modified on Mar. 15, 2013 and retrieved from <http://en.wikipedia.org/w/index.php?title=Latency_(engineering)&oldid=544384746> Mar. 19, 2013.

Measuring network throughput from Wikipedia, last modified on Mar. 13, 2013, and retrieved from <http://en.wikipedia.org/w/index.php?title=Measuring_network_throughput&oldid=543830600> Mar. 19, 2013.

International Preliminary Report on Patentability for International Application No. PCT/IB2013/001036 with a mailing date of Sep. 23, 2014.

* cited by examiner

/interface/wifi-2-1# show RF-survey

| mac addr | ch | rssi(dBm) | rate | bytes | Int(ms) | Time(us) | age(s) | bsstype | privacy | ssid |
|---|---|---|---|---|---|---|---|---|---|---|
| 64:D9:89:6A:F0:24 | 6 | -87 | 1 | 224 | 100 | 18420 | 0 | infra | yes | |
| 64:D9:89:6A:F0:22 | 6 | -84 | 1 | 224 | 100 | 18420 | 1 | infra | yes | |
| E0:91:F5:E4:6D:7E | 6 | -84 | 1 | 180 | 100 | 14900 | 0 | infra | yes | Alecia |
| 00:1E:E5:32:CA:D3 | 6 | -83 | 1 | 178 | 100 | 14740 | 1 | infra | yes | pitbull |
| 64:D9:89:6A:F0:27 | 6 | -83 | 1 | 224 | 100 | 18420 | 0 | infra | yes | |
| 64:D9:89:6A:F0:2E | 6 | -83 | 1 | 180 | 100 | 14900 | 0 | infra | yes | |
| 64:D9:89:6A:F0:2A | 6 | -82 | 1 | 224 | 100 | 18420 | 0 | infra | yes | |
| 64:D9:89:6A:F0:26 | 6 | -82 | 1 | 224 | 100 | 18420 | 0 | infra | yes | |
| 64:D9:89:6A:F0:2D | 6 | -82 | 1 | 224 | 100 | 18420 | 0 | infra | yes | |
| 64:D9:89:6A:F0:23 | 6 | -82 | 1 | 224 | 100 | 18420 | 0 | infra | yes | |
| 00:25:9C:4D:DE:B2 | 6 | -81 | 2 | 280 | 100 | 11700 | 1 | infra | yes | interlinx |
| 64:D9:89:6A:F0:2C | 6 | -81 | 1 | 224 | 100 | 18420 | 0 | infra | yes | |
| 00:0F:66:82:52:18 | 6 | -78 | 1 | 208 | 100 | 17140 | 0 | infra | yes | linksys |
| 0C:D5:02:92:CA:A5 | 6 | -75 | 1 | 240 | 100 | 19700 | 0 | infra | yes | 11FX03035012 |
| E0:91:F5:D5:51:56 | 6 | -75 | 1 | 190 | 100 | 15700 | 0 | infra | yes | evans |
| 00:23:97:C0:A9:EF | 6 | -74 | 6 | 288 | 100 | 4340 | 0 | infra | yes | Belkin_N1_Wireless |
| 00:17:3F:21:30:8D | 6 | -67 | 1 | 232 | 200 | 9530 | 0 | infra | no | |
| 00:0D:67:11:41:DE | 6 | local | 6 | 228 | 100 | 3540 | 1 | infra | yes | default | noise floor: ............... -85(dbm)
beacon static load duty cycle....... 27.355%

Figure 2

MAC frame format

Frame Control field

Valid type and subtype combinations

| Type value b3 b2 | Type description | Subtype value b7 b6 b5 b4 | Subtype description |
|---|---|---|---|
| 00 | Management | 0000 | Association request |
| 00 | Management | 0001 | Association response |
| 00 | Management | 0010 | Reassociation request |
| 00 | Management | 0011 | Reassociation response |
| 00 | Management | 0100 | Probe request |
| 00 | Management | 0101 | Probe response |
| 00 | Management | 0110–0111 | Reserved |
| 00 | Management | 1000 | Beacon |
| 00 | Management | 1001 | Announcement traffic indication message (ATIM) |
| 00 | Management | 1010 | Disassociation |
| 00 | Management | 1011 | Authentication |
| 00 | Management | 1100 | Deauthentication |
| 00 | Management | 1101–1111 | Reserved |
| 01 | Control | 0000–1001 | Reserved |
| 01 | Control | 1010 | Power Save (PS)-Poll |
| 01 | Control | 1011 | Request To Send (RTS) |
| 01 | Control | 1100 | Clear To Send (CTS) |
| 01 | Control | 1101 | Acknowledgment (ACK) |
| 01 | Control | 1110 | Contention-Free (CF)-End |
| 01 | Control | 1111 | CF-End + CF-Ack |
| 10 | Data | 0000 | Data |
| 10 | Data | 0001 | Data + CF-Ack |
| 10 | Data | 0010 | Data + CF-Poll |
| 10 | Data | 0011 | Data + CF-Ack + CF-Poll |
| 10 | Data | 0100 | Null function (no data) |
| 10 | Data | 0101 | CF-Ack (no data) |
| 10 | Data | 0110 | CF-Poll (no data) |
| 10 | Data | 0111 | CF-Ack + CF-Poll (no data) |
| 10 | Data | 1000–1111 | Reserved |
| 11 | Reserved | 0000–1111 | Reserved |

Fig. 3c

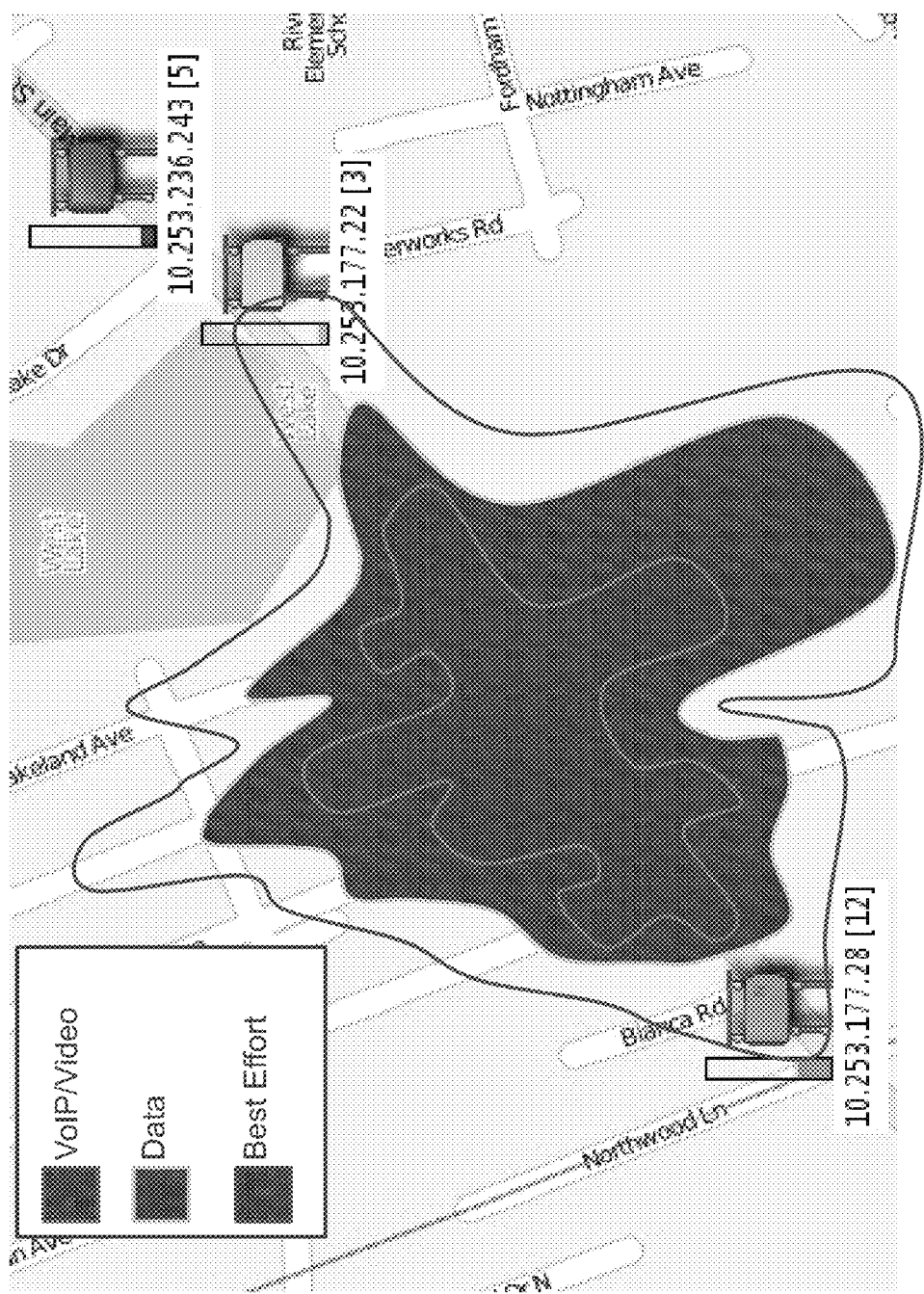

NULL-DATA PACKET THROUGHPUT SYSTEM AND METHOD

CROSS-REFERENCE TO RELATED APPLICATIONS

The present application claims priority to U.S. Provisional Patent Application No. 61/612,962, filed Mar. 19, 2012, the contents of which are incorporated herein by reference in their entirety.

TECHNICAL FIELD

The present invention relates to wireless communication systems. More specifically, the present invention relates to wireless local area networks ("WLAN"), Wi-Fi, and pico-cellular wireless communications systems, including IEEE 802.11 systems.

BACKGROUND

With the evolution of wireless networks driven by a significant increase in wireless mobile data, plus the proliferation of wireless transceivers, spectrum interference and the volume of data communicated in a network are rapidly becoming limiting factors in determining cell size, coverage, and efficiency.

Customers who purchase wired or wireless data plans typically demand service-level agreements ("SLA"). These SLAs typically define gigabytes/month, service availability, and service quality.

It is generally known that Wi-Fi networks are "best effort" because these systems operate in unlicensed spectrum and are therefore not operationally guaranteed. However, service level targets ("SLT") can still be defined and published to customers so that they understand the targeted service level expected of their data plan. An example SLT is for Voice over Internet Protocol (VoIP) and video traffic. The service-level target is to be able to deliver VoIP (e.g., Skype™) and video traffic (e.g., video streaming such as "on demand" services or video calls, such as "FaceTime™"). These services require a level of capacity and availability of the channel to be able to offer a specified number of sessions at a given throughput and packet loss.

The present application employs a novel technique to characterize the coverage and capacity of a Wi-Fi network so as to be able to establish reasonable confidence in the ability to achieve service level targets as defined for specific applications, which may be accomplished using NULL-data packets ("NDP" or "NULL-packets").

SUMMARY OF THE INVENTION

According to a first aspect of the present invention, a system and method for improving signal reception in an access point comprises the steps of (a) transmitting a 802.11 NULL-data packet to a client wherein the traffic test is initiated at a predetermined interval; (b) receiving an 802.11 ACKnowledgement packet from the client wherein the 802.11 ACKnowledgement packet indicates that the packet was received by the client; and (c) discarding the 802.11 NULL-data packet after receipt.

According to a second aspect, a system for improving signal reception in an access point comprises: a client device; and an access point, wherein the access point is communicatively coupled with the client device, the client device being configured to: (1) receive a packet having a non-zero byte length field from the access point; (2) transmit an ACKnowledgement packet to the access point indicating that the packet was received by the client device; and (3) discard the packet having a non-zero byte length field after transmitting the ACKnowledgement packet. The 802.11 NULL-packet may be: (1) an IEEE 802.11a NULL-packet; (2) an IEEE 802.11a NULL-packet; (3) an IEEE 802.11b NULL-packet; (4) an IEEE 802.11g NULL-packet; (5) an IEEE 802.11n NULL-packet; and/or (6) an IEEE 802.11ac NULL-packet.

According to a third aspect, a method for testing data traffic comprises: transmitting a plurality of 802.11 NULL-packets from a source radio to a destination radio, wherein said plurality of 802.11 NULL-packets comprises at least one zero-byte length field 802.11 NULL-packet; receiving, from the destination radio, an ACKnowledgement packet for at least one of said plurality of 802.11 NULL-packets; and deriving statistics at the source radio using said ACKnowledgement packet.

According to a fourth aspect, a method for improving signal reception in an access point comprises: transmitting a plurality of 802.11 NULL-packets to a client, wherein at least one of said plurality of 802.11 NULL-packets has a zero-byte length, wherein a traffic test is initiated at a predetermined interval; receiving an 802.11 ACKnowledgement packet from the client, wherein said 802.11 ACKnowledgement packet indicates that a 802.11 NULL-packet was received by the client; and using 802.11 ACKnowledgement statistics to determine at least one of: (1) Mbps throughput, (2) packet error rate, (3) packet latency, or (4) spectrum busyness for a tested client.

According to a fifth aspect, a method for improving signal reception in an access point comprises the steps of: transmitting a plurality of 802.11 aggregated NULL-packets to a client, wherein at least one of said plurality of 802.11 aggregated NULL-packets has a zero-byte length, wherein the traffic test is initiated at a predetermined interval; receiving a 802.11 Block ACKnowledgement packet from the client wherein the 802.11 Block ACKnowledgement packet indicates that two or more 802.11 aggregated NULL-packets were received by the client; and using 802.11 Block ACKnowledgement statistics to determine at least one of Mbps throughput, packet error rate, packet latency, and/or spectrum busyness for the specific client tested. Said plurality of 802.11 aggregated NULL-packets may comprises zero-byte length field NULL-packets and/or non-zero-byte length field NULL-packets.

According to a sixth aspect, a method for improving signal reception in an access point comprises the steps of: transmitting a plurality of 802.11 NULL-packets to a plurality of clients using a Multi-User Multiple-Input and Multiple-Output protocol, wherein at least one of said plurality of 802.11 NULL-packets has a zero-byte length, wherein the traffic test is initiated at a predetermined interval; receiving an 802.11 ACKnowledgement packet from each client wherein the 802.11 ACKnowledgement packet indicates that a 802.11 NULL-packet was received by the client; and using 802.11 ACKnowledgement statistics to determine at least one of: (1) Mbps throughput; (2) packet error rate; (3) packet latency; or (4) spectrum busyness for the specific client tested.

According to a seventh aspect, a method for estimating the SLA or SLT of one or more Access Points comprises the steps of: transmitting a plurality of NULL-packets to one or more clients using an 802.11 or using Multi-User Multiple-Input and Multiple-Output protocol; receiving a plurality of ACKnowledgement packets; and using said plurality of ACKnowledgement packets to derive network level statistics.

In certain aspects, the destination radio or client may individually or Block ACKnowledge each of said plurality of 802.11 NULL-packets and/or 802.11 aggregated NULL-packets. The statistics may relate to one or more of: (1) throughput; (2) packet error rate; (3) latency; or (4) spectrum busyness. The plurality of 802.11 NULL-packets and/or 802.11 aggregated NULL-packets may comprises zero-byte length field NULL-packets and/or non-zero-byte length field NULL-packets. The one or more 802.11 NULL-packets and/or 802.11 aggregated NULL-packets may be transmitted using (1) 802.11n packet aggregation or (2) 802.11 Multi-User Multiple-Input and Multiple-Output protocol.

DESCRIPTION OF THE DRAWINGS

These and other advantages of the present invention will be readily understood with reference to the following specifications and attached drawings wherein:

FIG. 2 provides a view of data collected and manipulated using a Radio Frequency (RF) Survey tool;

FIG. 3c illustrates examples of valid combinations of type and subtype in accordance with IEEE standards;

FIG. 5 provides an example view of NULL-data packet SLA-processed data with geo-location;

DETAILED DESCRIPTION

Figure 1:
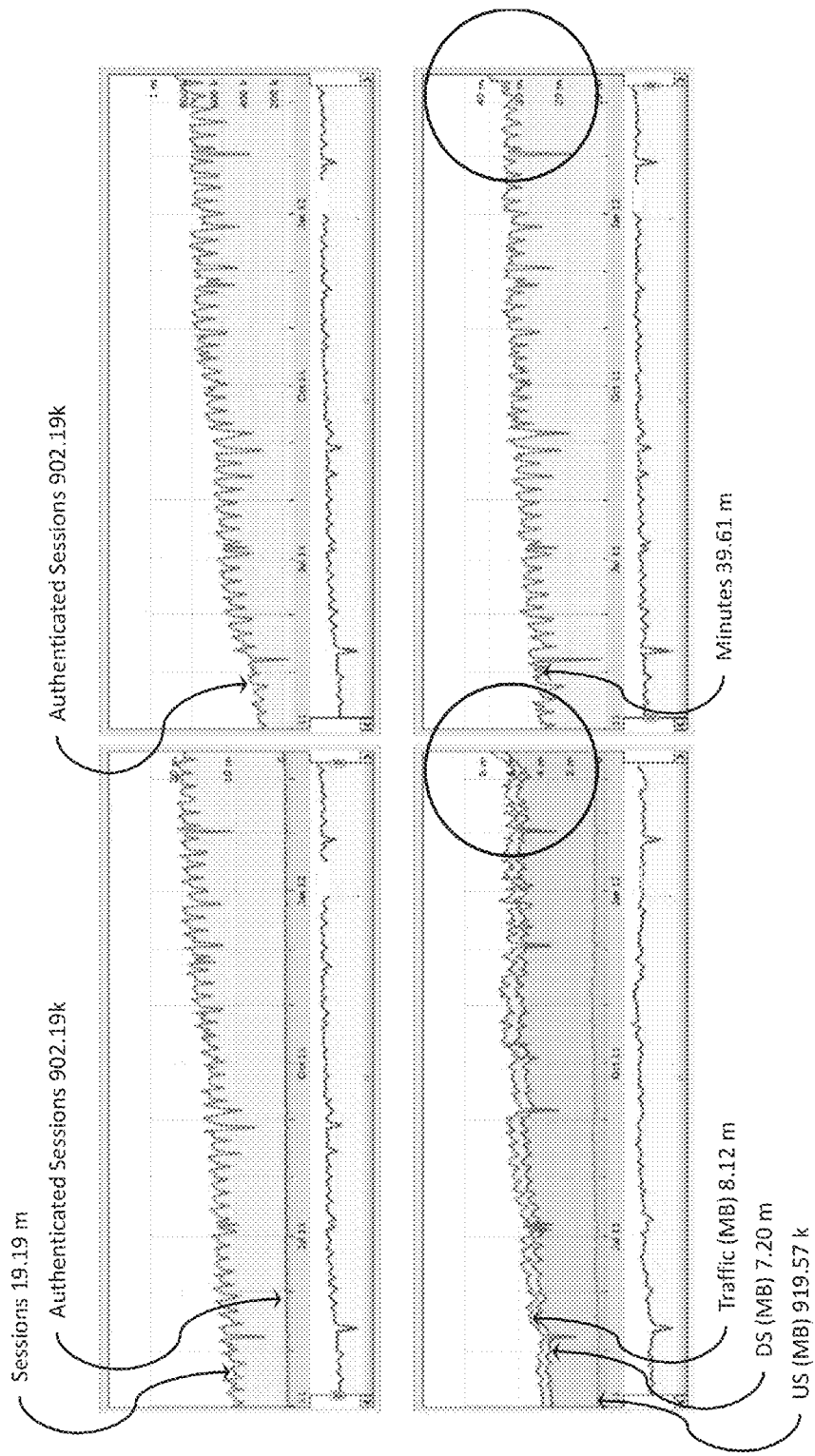
FIG. 1 illustrates network data for a network over a one-week period.

Preferred embodiments of the present invention will be described hereinbelow with reference to the accompanying drawings. In the following description, well-known functions or constructions are not described in detail because they may obscure the invention in unnecessary detail. For this disclosure the following terms and definitions shall apply:

The terms "IEEE 802.11" and "802.11" refer to a set of standards for implementing WLAN computer communication in the 2.4, 3.6, and 5 GHz frequency bands. The set of standards being maintained by the IEEE LAN/MAN Standards Committee ("IEEE 802"). Section 3.239 of the IEEE 802.11n standard "IEEE Standard for Information technology—Telecommunications and Information exchange between systems—Local and metropolitan area networks—Specific Requirements. Part 11: Wireless LAN Medium Access Control (MAC) and Physical Layer (PHY) Specifications" Amendment 5: Enhancements for Higher Throughput" defines a "null-data packet (NDP)" as "[a] physical layer convergence procedure (PLCP) protocol data unit (PDU) that carries no Data field." The IEEE standard defines NULL-data packets for different applications, such as verification that a client is still associated and located in the cell, and for sounding packets used for explicit beamforming. For additional information, see ANSI Std. 802.11, 1999 Edition "Information technology—Telecommunications and information exchange between systems—Local and metropolitan area networks—Specific requirements—Part 11: Wireless LAN Medium Access (MAC) and Physical Layer (PHY) Specifications."

The terms "communicate" and "communicating," as used herein, include both conveying data from a source to a destination, and delivering data to a communications medium, system, channel, network, device, wire, cable, fiber, circuit, and/or link to be conveyed to a destination; the term "communication," as used herein, means data so conveyed or delivered. The term "communications," as used herein, includes one or more of a communications medium, system, channel, network, device, wire, cable, fiber, circuit, and/or link.

The term "processor," as used herein, means processing devices, apparatus, programs, circuits, components, systems and subsystems, whether implemented in hardware, tangibly embodied software or both, and whether or not programmable. The term "processor," as used herein, includes, but is not limited to, one or more computers, hardwired circuits, signal modifying devices, and systems; devices and machines for controlling systems, central processing units, programmable devices and systems; field programmable gate arrays, application-specific integrated circuits, systems on a chip, systems comprised of discrete elements and/or circuits, state machines, virtual machines, data processors, processing facilities, and combinations of any of the foregoing.

The terms "storage" and "data storage," as used herein, mean one or more data storage devices, apparatus, programs, circuits, components, systems, subsystems, locations, and storage media serving to retain data, whether on a temporary or permanent basis, and to provide such retained data. The terms "storage" and "data storage" as used herein include, but are not limited to, hard disks, solid state drives, flash memory, dynamic random-access memory (DRAM), random-access memory (RAM), read only memory (ROM), tape cartridges and any other medium capable of storing computer-readable data.

To monitor and manage multiple access points ("APs"), a number of network management tools are available. These network management tools may typically be used to handle the activities, methods, procedures, and tools that pertain to the operation, administration, maintenance, and provisioning of networked systems. An example of such a tool is Wi-Fi Manager (previously known as "BelView"), available from Ericsson, which acquired BelAir Networks in 2012 as a Product Development Unit ("PDU") of Ericsson Canada Inc.

For example, Wi-Fi Manager may be used to support and/or monitor 100,000 APs and may be used to provide comprehensive fault, configuration, accounting, performance, and security (FCAPS) functions that reduce deployment and troubleshooting time and speed up network deployments of the access points in a given network. Wi-Fi Manager may also be used to remotely provide software and securely updates to all, or a selected group of APs already deployed, while dual bank flash may allow for complete load reversion, if needed. In essence, Wi-Fi Manager enables network operators and/or service provides to easily provision, monitor, and manage a complete network built with any combination of products, including those by Ericsson. Wi-Fi Manager may also use, for example, the latest geographic information system (GIS) based mapping software and global positioning system (GPS) information to set up and manage the network, maximizing utility while minimizing cost. A comprehensive set of management features may include GPS-aware street map-based presentation, real-time fault and performance monitoring, and inventory and security management. For additional information on Wi-Fi Manager and its operation see, for example, Ericsson's Carrier Class Wi-Fi solutions website.

Turning to the figures, FIG. 1 illustrates the network data for a network over a one-week period. Specifically, data representing the traffic and minutes shows an increase over the week's time. These increases may be attributed, at least in part, to the removal of the hidden Service Set IDentifier ("SSID") across the network. Generally, the SSID comprises of an ASIC text readable name (such as "Optimum Wi-Fi") plus an Ethernet MAC address (called the basic service set identification (BSSID)), and is used to identify an 802.11 (Wi-Fi) network and specific APs within that network. The SSID acts as a unique network identifier that the wireless network administrator configures. Typically, users must know the SSID in order to connect to an 802.11 wireless network. However, in certain situations, network sniffing/scanning allows users to determine the SSID. The SSID is part of the management beacon frames which are transmitted at regular intervals, typically once every 100 ms. The BSSID is also transmitted as the receive address in every packet sent over the WLAN.

Each SSID that is transmitted at 1 Mbps, hidden or otherwise, represents a "static beacon load" of approximately 2%. Assuming that every APs sees four other APs in the network, and that each AP transmits both an SSID and a hidden SSID, then removal of the hidden SSID beacon will result in a 10% increase in channel availability. Thus, these SSIDs can excessively load the network. This was demonstrated when hidden SSIDs were removed from Wi-Fi networks located in Brooklyn and Long Island. The corresponding traffic increase was in proportion to the increase in channel availability. Thus, it is well-known by those skilled in the art, that network traffic is greatly affected by continuous transmissions such as beacons. Accordingly, the present disclosure relates to systems and methods for formally characterizing network throughput with minimal impact to overall network throughput.

Thus, to improve the network performance, two sets of tools were developed to enable rapid network optimization to occur. The first tool relates to changes to the RF-Survey command. An RF-Survey command may be used to provide details on the receiver busy duty cycle. The RF-Survey command enables an operator (e.g., a service provider or network manager) to quickly and accurately assess how busy a channel is based on, for instance, visible beacons. FIG. 2 provides an example view of the data collected, which may be manipulated using an RF-Survey tool. For example, each AP, which may be identified via its MAC address, may be listed along with information related to the AP, such as, for example, channel ("ch"), received signal strength indicator (RSSI) (in dBm), rate, bytes, Int (in ms), time (μs), age (s), bsstype, privacy, and SSID. The RF-Survey command may also provide information such as the noise floor and beacon-static, load-duty cycle. The RF-Survey command may be used to provide information that may be used to optimize the channel selection algorithm.

A second tool employs NULL-packet methodology/functionality and, as used herein, is generally referred to as a "NULL-packet tool." A NULL-packet tool may be employed through, or embodied within, for example, software and/or used in conjunction with a processor-controlled device. The NULL-packet tool enables an operator to accurately determine the delivered megabits per second (Mbps) traffic as a function of RSSI. In effect, a NULL-packet tool can be used to enable service providers and other AP operators to measure the performance of an AP on a channel and establish RSSI thresholds for "SLA" goals.

The NULL-packet tool, which may be selectively turned on/off (i.e., enabled/disabled), may be used to enable performance of random traffic tests (e.g., 0.1-1000 ms, preferably 1-500 ms, more preferably 50-250 ms, and most preferably 100 ms) at given intervals (e.g., 1-100 s, preferably 1-50 s, more preferably 10-40 s, and most preferably 20 s) using, for example, Quality of Service (QoS) NULL-packets (e.g., 1-3000 bytes, preferably 500-2500 bytes, more preferably 1000-2000 bytes, and most preferably 1500 bytes). The NULL-packet is unique in that, for example, it may be received by a client device, 802.11 ACKnowledged, and then discarded. As a result, the NULL-packet is not passed up to higher layer software applications in the client devices, so that it does not cause unwanted behavior. A NULL-packet, as used herein, refers to characterizing the IEEE 802.11 physical layer interface, as well as the shared media—that is, the interference and activity levels of the unlicensed spectrum across which the 802.11 protocol operates.

A NULL-packet test tool may be used as a direct measurement of the end user experience. Each NULL-packet traffic test may enable a single data point to be collected (RSSI, Mbps). For example, a total of 4320 data points/day/AP may be collected yielding a good statistical view of the AP coverage with, for example, a 0.5% traffic load (less than one-fourth of a single beacon).

The NULL-packet test tool has an added advantage of enabling the AP to update the statistical packet success rates for all associated clients in the cell, especially those whose data transmissions have been sporadic and where the clients may have moved out of the cell.

The NULL-packet test tool may also be used in the dynamic decision process of cellular "traffic steering" by enabling the AP to measure the client throughput at regular intervals, so that decisions may be made by other software entities to transfer the client devices from Wi-Fi to a higher performing cellular network, such as long-term evolution (LTE).

NULL-packet data may be collected in the AP and be available through a command-line interface (CLI) command and/or otherwise communicated to a device, third party, and/or other network. Confidence intervals can then be used to determine desired the RSSI thresholds required to achieve SLA or SLT targets. A NULL-packet tool may also enable an operator to accurately measure the impact of AP configuration changes such as channel changes, noise floor settings, RSSI association thresholds, lowered beacon power levels, etc.) to achieve the best cell performance. These Radio Resource Management ("RRM") configuration changes are important to ensuring that AP parameters are optimized to enable end clients to achieve the best possible user experience.

Figure 3A:
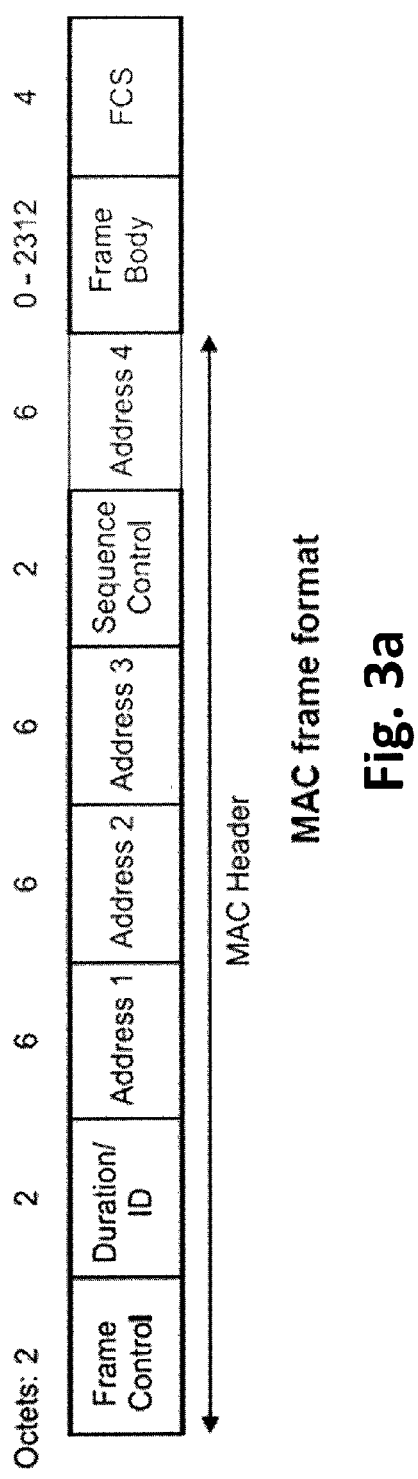
FIG. 3a illustrates a MAC frame in accordance with Institute of Electrical and Electronics Engineers (IEEE) standards.

To better understand NULL-data packets, a short description of the 802.11 MAC is provided. The IEEE defines different a MAC frame as (a) an MAC header, which comprises frame control, duration, address, and sequence control information; (b) a variable length frame body, which contains information specific to the frame type; and (c) frame check sequence ("FCS"), which contains an IEEE 32-bit cyclic redundancy code ("CRC"). This format is shown in FIG. 3a. The Frame control field is a type byte field defined in FIG. 3b. The type and subtype fields are defined in IEEE section 7.1.3.1.2, which states that the Type field is 2 bits in length and the Subtype field is 4 bits in length. The Type and Subtype fields together identify the function of the frame. There are three frame types: control, data, and management. Each of the frame types has several defined subtypes. The table provided in FIG. 3c defines valid combinations of type and subtype. Valid type and subtype combinations are listed in the table. The packet types include Management, Control, Data, and Reserved. NULL-packets are a specific subtype of Data packet. The Subtype description for a NULL-data packet is "NULL function (no data)."

The NULL-data packet is a standard capability supported by all clients with known and well-defined actions. The client is generally required to receive the packet and ACKnowledge ("ACK") the packet using an 802.11 ACKnowledgement packet (e.g., an ACK protocol or "ACK packet"). After receipt, the NULL-data packet may be discarded.

Figure 3B:
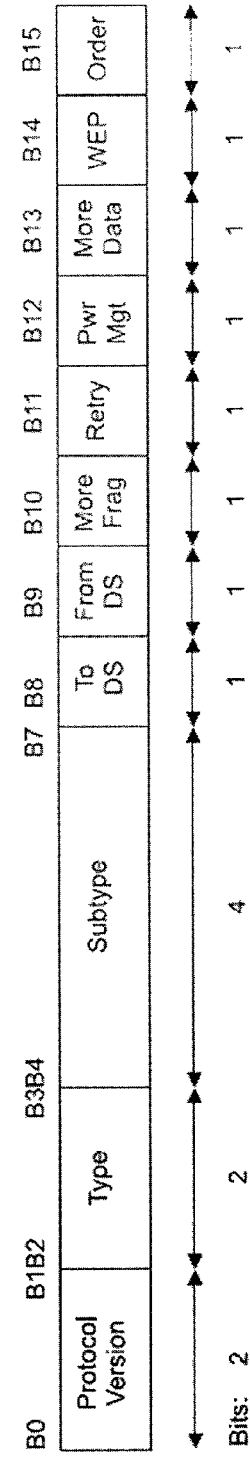
FIG. 3b illustrates a frame control field in accordance with IEEE standards.
Figure 3D:
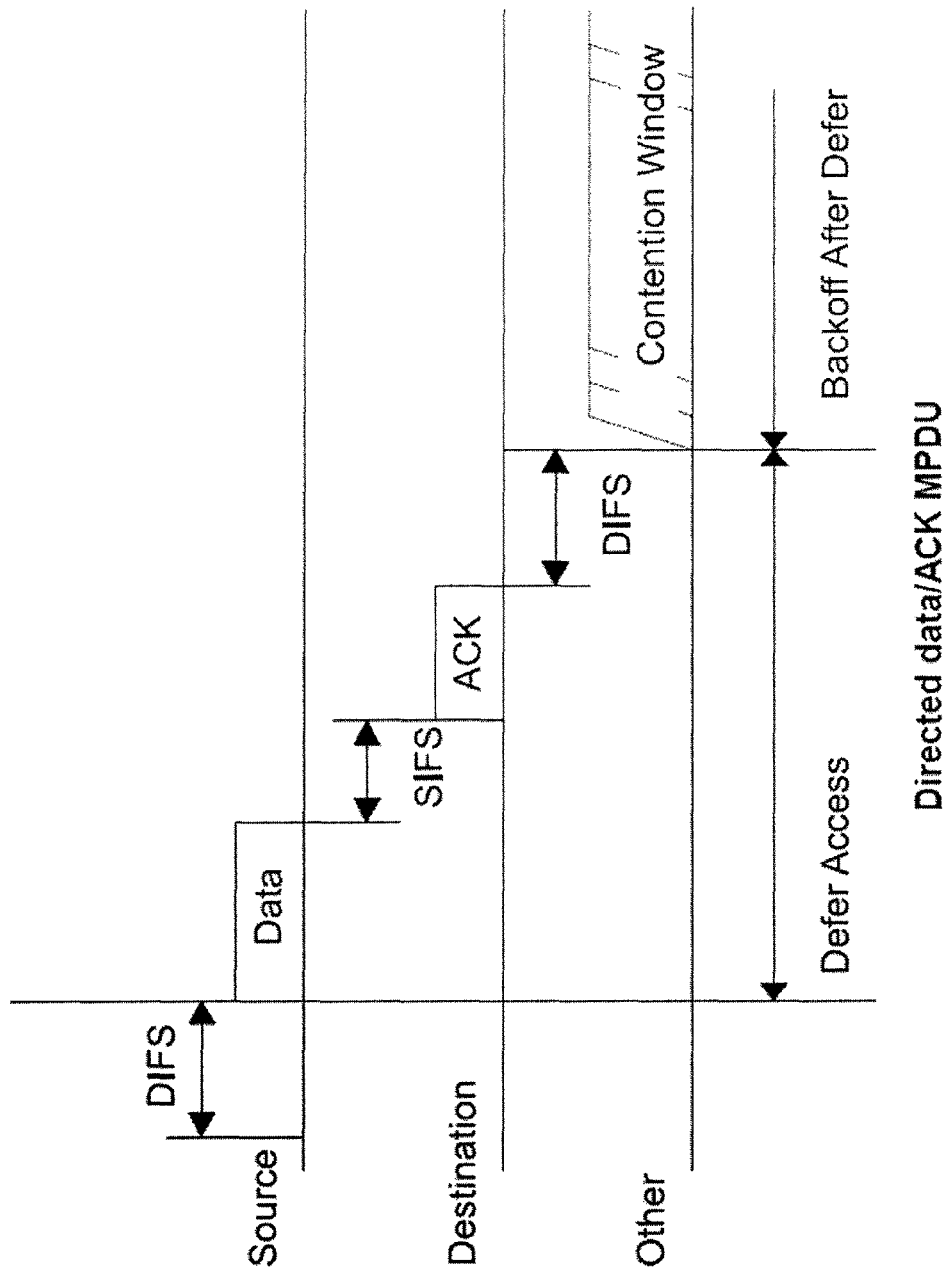
FIG. 3d illustrates a diagram illustrating timing spacing used in a handshake protocol.

The MAC procedure for data packet transmissions, followed by ACKnowledgements ("ACK") are shown in FIGS. 3a-3c. The Distributed Coordination Function ("DCF") Interframe Space ("DIFS") and Short Interframe Space ("SIFS") times are unique to IEEE 802.11 and define interface timing spacing used in this handshake protocol. FIG. 3d provides a diagram illustrating timing spacing used in this handshake protocol.

Therefore, in a first configuration, a NULL-packet tool and/or associated NULL-packet methodology may be employed in an Access Point ("AP") and used to, for example, initiate short 100 ms periodic traffic tests, every 20 s, to clients associated to that AP using non-zero 1500 byte length 802.11 NULL-data packets. The NULL-packet tool and/or methodology may be used to calculate the effective data rate delivered to that specific client at a unique location in the cell at a given RSSI level, QoS setting, and packet size.

Moreover, a NULL-packet tool and/or methodology may be enabled or disabled (i.e., turned ON/OFF), the packet length to be defined (e.g., 1500 bytes, but may be longer or shorter), the traffic test duration to be defined (e.g., 100 ms, but may be longer or shorter), and the Wi-Fi QoS level to be set (typically high for voice, medium for video, low for data, and best effort for other services). For example, the byte length of the 802.11 NULL-data packets may be between 1000 and 2000 bytes, preferably approximately 1500 bytes, although different packet sizes and QoS classes may be employed to determine the achievable SLTs for these differentiated services and the periodic traffic test may be between 0.1 ms and 1000 ms, preferably approximately 100 ms. In the case where the periodic traffic test is short, the throughput test is defined more discretely in packet counts, rather than in Mbps.

A NULL-packet tool and/or methodology may be used to collect statistics about the various tests, including the Mbps, RSSI, QoS setting, data packet length, number of packet retransmissions, number of dropped packets, packet success rates verses packet modulation rates, packet success rates verses packet aggregation size, packet success rates verses QoS setting, packet success rates verses RSSI, and client type derived from the Ethernet MAC Organizationally Unique Identifier (OUI). Moreover, the NULL-packet test tool may be used to drive Self Optimizing Networks ("SON") functionality, such as RRM channel characterization and operation, characterizing packet error rate ("PER") vs. Signal to Interference plus Noise Ratio ("SINR"). Other SON functions may benefit from the NULL-packet tool such as optimizing the tradeoff of receiver desensitizing vs. throughput, and characterizing the operational performance of multiple-input and multiple-output ("MIMO") transmissions, including multi-user MIMO ("MU-MIMO") operation.

Figure 4:
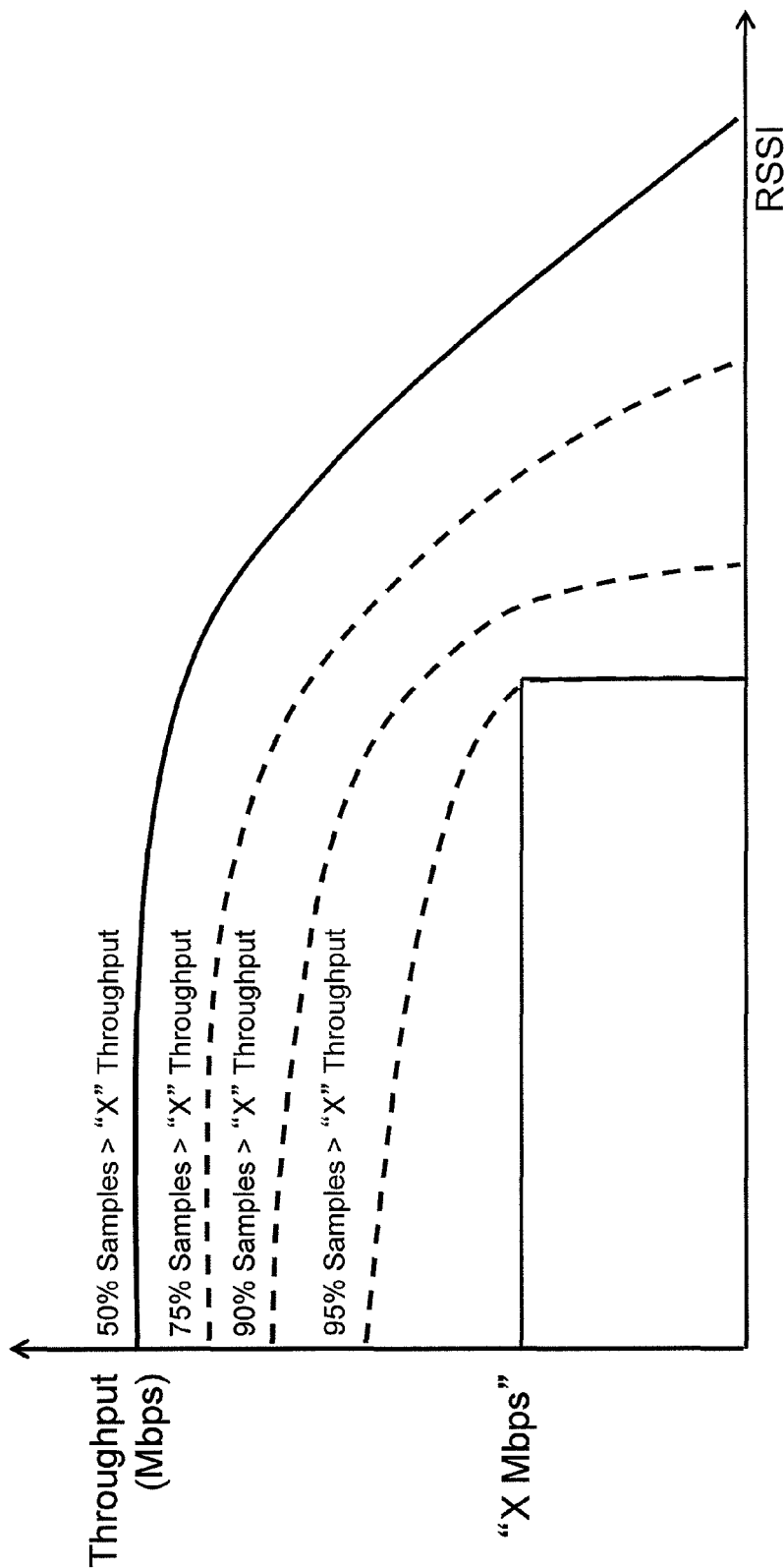
FIG. 4 illustrates a graph of example SLA data.

A NULL-packet tool and/or methodology may facilitate collection of statistics that are available through a CLI or Management Information Base (MIB) such as 15-minute PMs so that overall service level targets can be determined as a function of the various parameters collected, most notably RSSI, QoS setting, and client type. The SLA, in its most simplistic form, may be seen as the ability to achieve a throughput of "X" Mbps to a client at a specified RSSI (receive signal strength indication) to within a specified confidence level (e.g., 95%). The SLA values may be different for voice and video. FIG. 4 provides a graph illustrating example SLA data.

In a second configuration, a NULL-packet tool and/or methodology may be configured to include a scheduled throughput test wherein NULL-data packets are transmitted not in a 100 ms burst to determine throughput, but rather at 100 ms or 200 ms or 300 ms intervals and scheduled using the DTIM intervals. Accordingly, a NULL-packet tool and/or methodology may take steps to closely approximate real-time VoIP or Video applications, such as Skype™ or FaceTime™, wherein packet deliveries are scheduled at delivery traffic indication message (DTIM) intervals so as to minimize the battery consumption for mobile devices.

Thus, a NULL-packet tool and/or methodology on the AP could be used to run short 10 s to 30 s "rated-limited" traffic tests delivering a few packets at a scheduled rate to one or more clients associated to that AP. The rate limiting could yield, for example, a 50 kbps throughput for a Skype™ call, or a 350 kbps limit for a YouTube™ video.

The clients may be "informed" through beacon DTIM indications that they have data, and are required to wake up to receive that data, but they would be delivered NULL-data packets. This configuration may be used to measure the service level targets for these applications, and verifies subsystems such as "smart" antennas, or "transmit beam-forming" systems, all of which behave differently for directed throughput tests than they do for periodic tests.

A NULL-packet tool and/or methodology NULL may be further enabled to calculate a mean opinion score (MOS) with each client test as defined by the type of client, the unique location in the cell, the RSSI, level, QoS setting, etc.

This second configuration has control inputs and outputs similar to those of the first configuration. Although it may or may not be preferred, as disclosed herein, the ability to employ other special 802.11 MAC subtypes, including future reserved codes to be able to perform the same functions, is contemplated.

The NULL-packet tool and/or methodology may be used in conjunction with geo-location, whereby the collected SLA statistics are associated with accurate location information of the client being tested. Including accurate geo-location information with the data collected from each NULL-data packet traffic test enables accurate topographical maps of SLA zones to be drawn. The data collected by each NULL-packet traffic test could then include location data—latitude/longitude details on where the test was conducted so that SLA zones can be mapped—such as "BE" (best effort), "DATA" (data traffic), and SLA (VoIP/Video SLA). Simplistically, the regions would be different for each type of AP tested. FIG. 5 provides an example view of NULL-data packet SLA processed data with geo-location.

The NULL-packet tool may also be used to characterize high capacity venues such as stadiums, and to determine the statistical throughput limits of the stadium for 2.4 GHz and 5 GHz operation. For example, the NULL-packet tool may be used to determine that a specific stadium, which has been deployed for high capacity Wi-Fi, is capable of carrying a maximum network (bowl) level throughput of 5800 Mbps. This is a useful application, as those skilled in the art know that every data system has theoretical capacity limits, and the ability to test and determine those capacity limits is important to the formalized acceptance testing of a network.

The RF-Survey command and NULL-data packet functionality may be used, whether in conjunction or separately, to enable an operator to optimize the channels and operation of all APs in the provider's network.

Figure 6C:
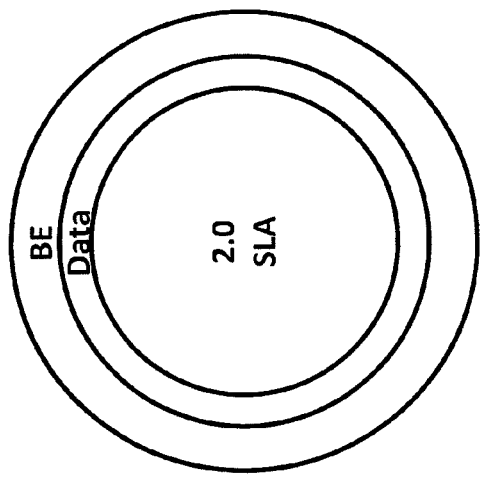
FIGS. 6a-6c, illustrate how different Access Points may achieve unique SLA coverage areas.
Figure 6B:
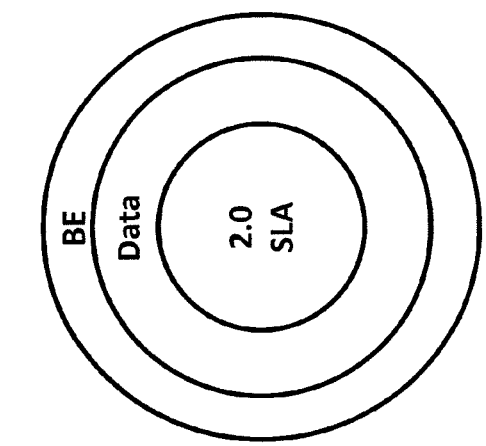
Figure 6A:
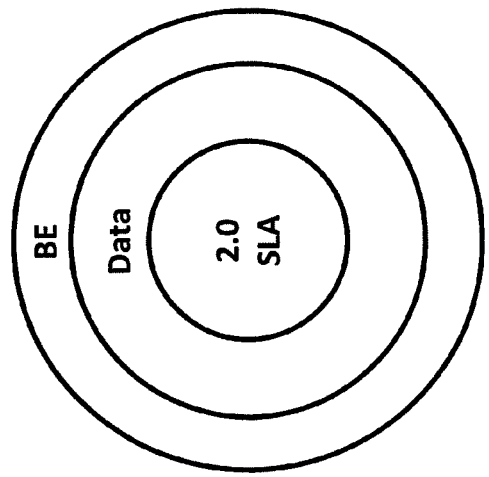

"Service-level agreement" and "Wi-Fi" are usually not synonymous terms largely because of concerns over unlicensed spectrum. Unlicensed/uncontrolled spectrum affects both cell size and throughput. However, without a direct measurement of end user experience in relation to a desired SLA target, a higher performance network cannot be built. Therefore, these tools are needed to measure desired SLA targets so that network planning, more advanced APs, and new controller features will allow us to build the a higher performance network. Building blocks will need to be characterized. For example, as illustrated in FIGS. 6a-6c, different APs will achieve unique SLA coverage areas.

Figure 7A:
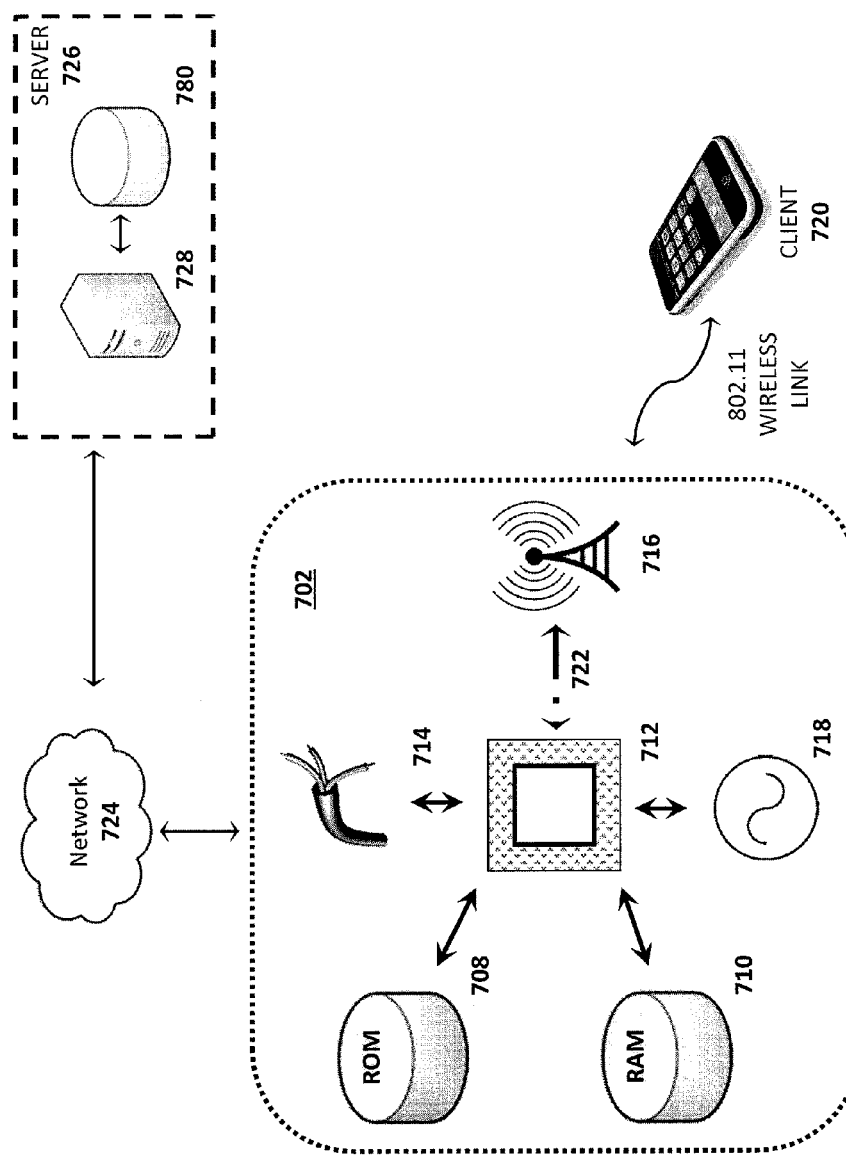
FIGS. 7a and 7b illustrate the components of an example Access Point.

Referring now to FIG. 7a, an example AP 702 may comprise a processor 712, power supply 718, antenna 716, wired communication link 714, wireless connection interface 722 (e.g., RF transceiver, RF front end, etc.), and data storage including, for example, RAM 710 and ROM 708. As depicted in the figure, the AP 702 may communicate with a client 720 (e.g., a wireless device) using an over-the-air wireless link (e.g., via an 802.11 wireless link) and with a server 726 via the wired communication link 714 over a network 724. The server 726 generally comprises a computer 728, such as a processor-based device, coupled to data storage 730.

The antenna 716 may be a traditional antenna or a smart antenna. The wired connection 714 may be enabled to receive a packet having a sequence number N from the server 726, and to communicate an ACKnowledgement packet to the server 726. The wireless connection 722 may be enabled to wirelessly communicate the packet from the server 726 to a client 720, via AP 702, and receive a wireless-ACK (e.g., 802.11 ACK) from the client 720 using, for example, a smart antenna 716 coupled to the wireless connection 722. In operation, receipt of the wireless-ACK from the client 720 may be used by the AP 702 to trigger communication of the ACKnowledgement packet to the server 726, thereby increasing efficiency.

Figure 7B:
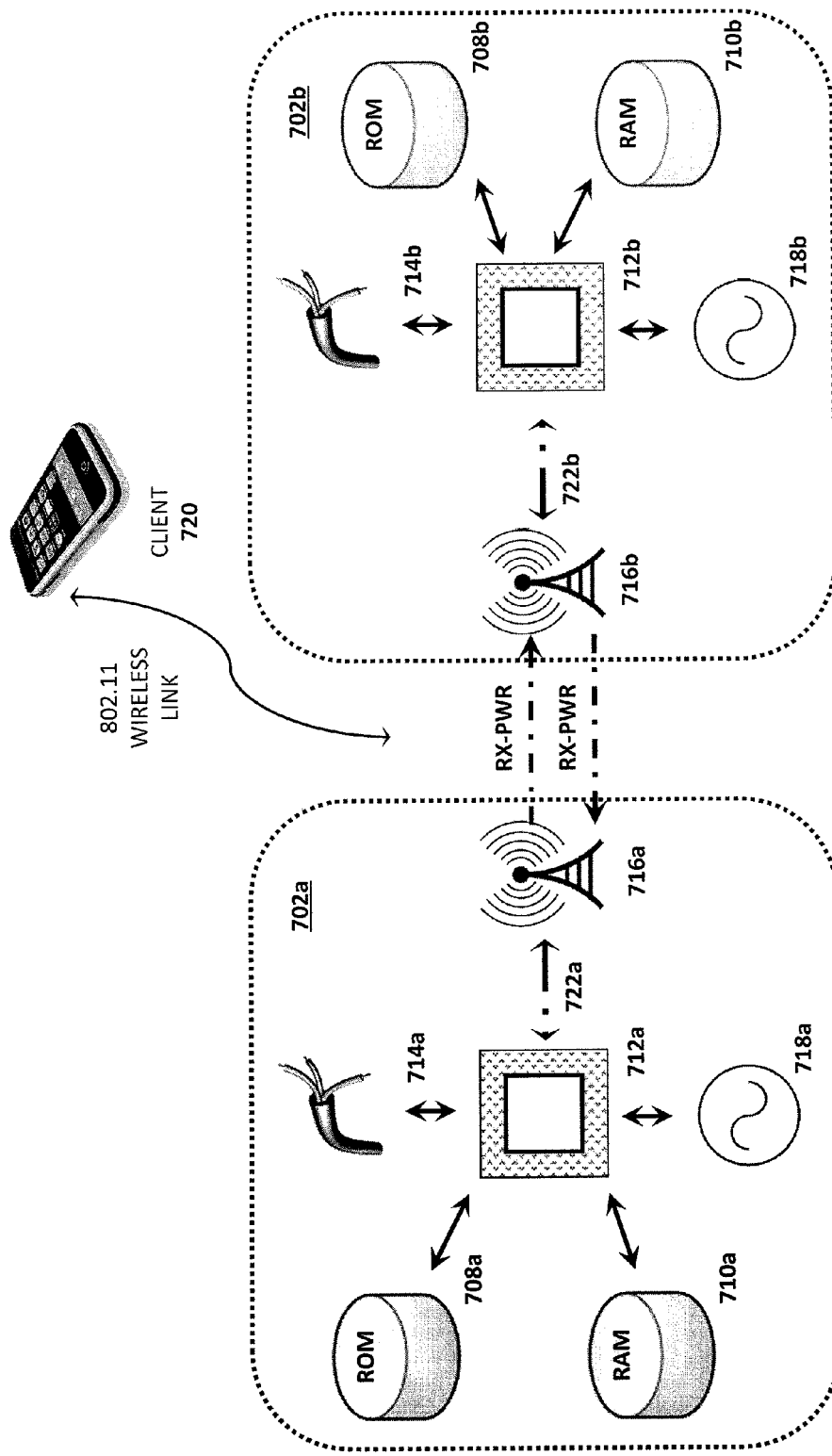

Referring now to FIG. 7b, two identical APs 702a and 702b, as described in FIG. 7a, are illustrated in communication with one another and at least one client 720. As illustrated, an AP 702a is not limited to wireless communication with a client 720, but rather AP 702a may wirelessly communicate with another AP 702b and/or a client 720. While APs 702a and 702b are illustrated as being identical to the AP 702 of FIG. 7a, they need not be in order to communicate. In fact, data collected or created by the AP 702a may also be communicated to another AP 702b, client 720 or any other device capable of wired or wireless communication. In certain embodiments, AP 702a may even communicate with AP 702b or a client device 720 using a wired communication link 714a in addition to, or in lieu of, the antenna 716a and wireless interface 722a.

Figure 8:
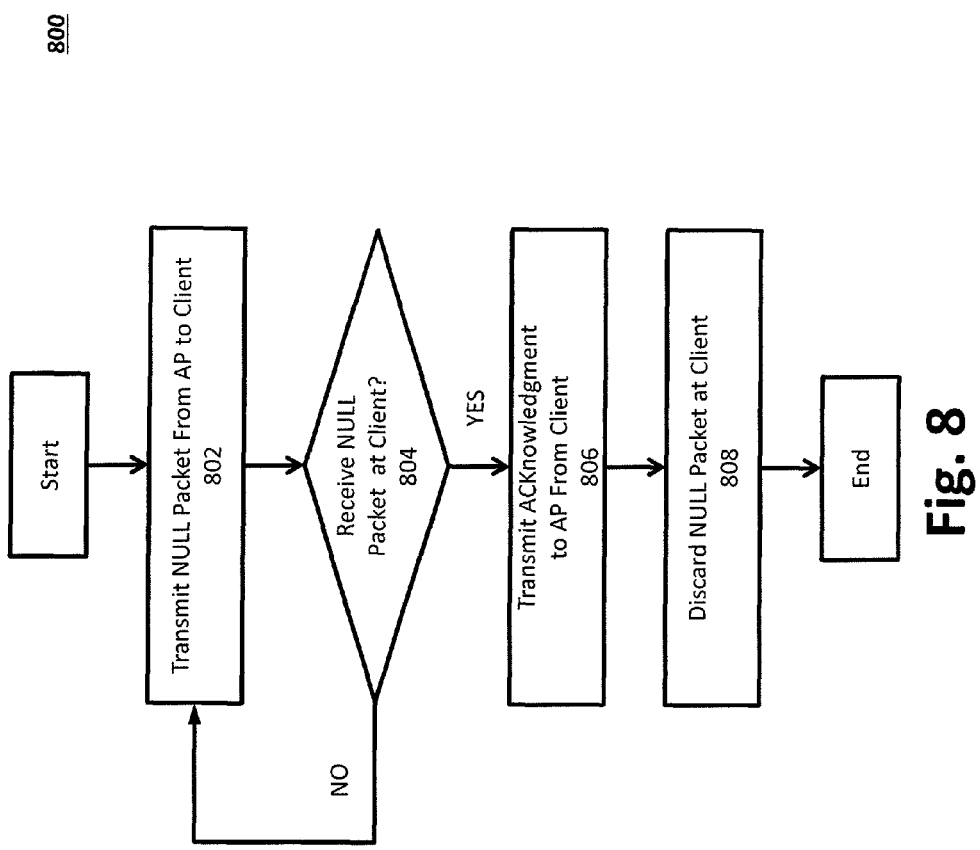
FIG. 8 illustrates a flowchart of a NULL-packet transfer.

As illustrated in FIG. 8, a packet, with non-zero byte length field, may be transmitted from a radio (e.g., Access Point 702) to a remote client device (e.g., client 720) at step 802. The transmitted packet may be an 802.11 NULL-packet, including, for example, an IEEE 802.11a, or 802.11b, or 802.11g, or 802.11n, and/or 802.11ac NULL-packet. If the NULL-packet is received at step 806, the client may ACKnowledge receipt by transmitting an ACKnowledgement packet to the radio at step 806. If the NULL-packet is not received at step 806, process may return to step 803 where the radio may re-transmit the packet to the client. Once the client has ACKnowledged receipt of the packet at 806, the client may subsequently discard the packet at step 808 by, for example, the remote client's MAC layer.

Figure 9:
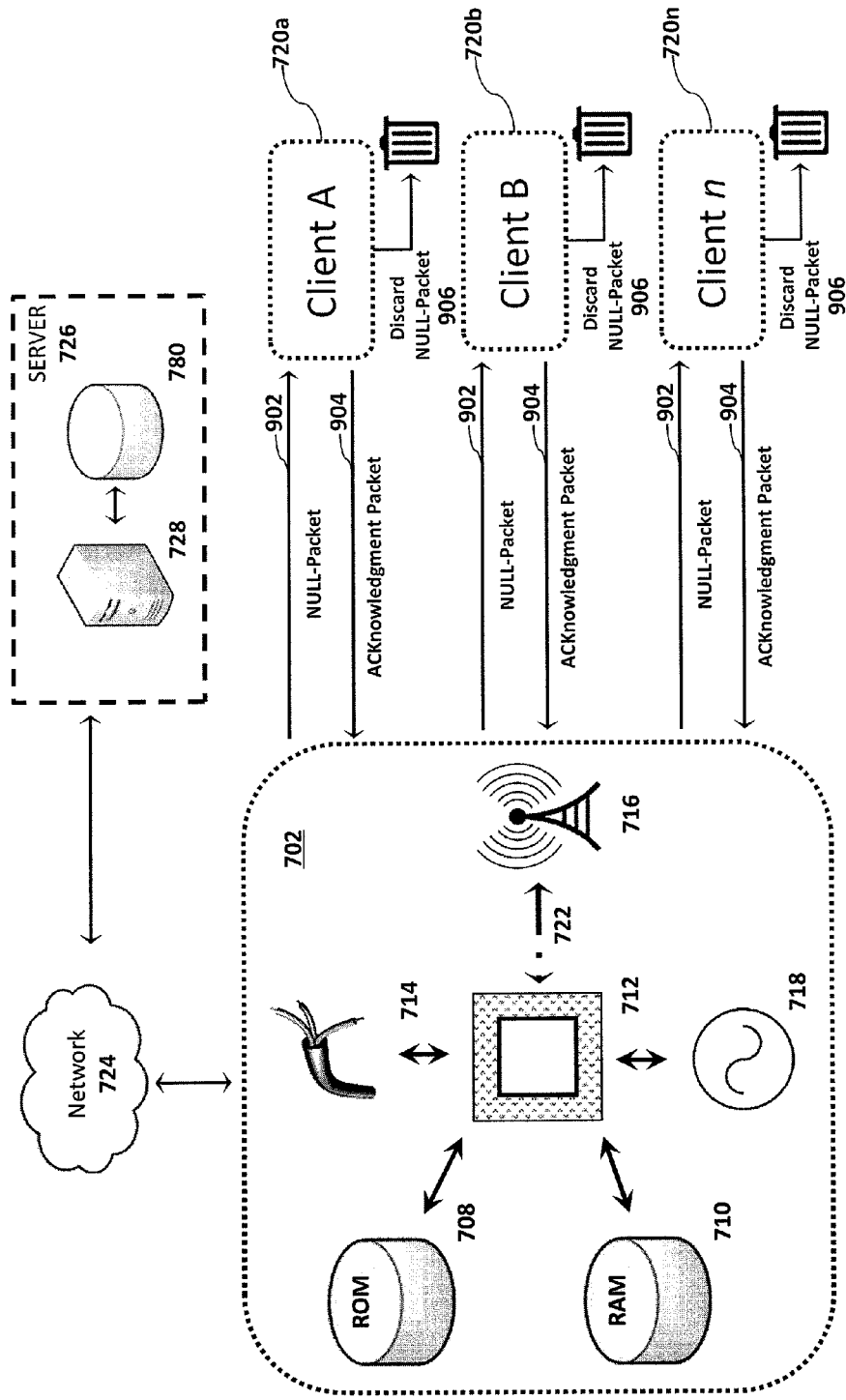
FIG. 9 illustrates a NULL-packet transfer using an Access Point.

Accordingly, as illustrated in FIG. 9, a system 900 for improving signal reception in an access point may comprise one or more client devices 720a, 720b, and 720n and at least one access point 702. As illustrated, the access point 702 is communicatively coupled with one or more client devices 720a, 720b, and 720n via, for example, a wireless link. Each of said client devices 720a, 720b, and 720n may be configured to: (1) receive a packet having a non-zero byte length field from the access point 702, such as a 802.11 NULL-packet 902; (2) transmit an ACKnowledgement packet 904 to the access point 702 indicating that the NULL-packet 902 was received by the client device; and (3) discard the packet having a non-zero byte length field after transmitting the ACKnowledgement packet 906. For instance, the client device may discard the packet having a non-zero byte length field via the client device MAC layer.

In operation, a traffic test, comprising of a sequence of zero-byte length field 802.11 NULL-packets, may be transmitted from a source radio (e.g., Access Point 702) to a destination radio (e.g., client 720), which may be individually ACKnowledged by the destination radio to the source radio, so that the source radio can derive statistics of throughput, PER, latency, and/or spectrum busyness from the received packet ACKnowledgements. The sequence may comprise zero-byte length field and/or non-zero-byte length field NULL-packets. Similarly, a traffic test, comprising of a sequence of zero-byte length field 802.11 NULL-packets, may be transmitted using 802.11n packet aggregation from a source radio to a destination radio. The sequence of zero-byte length field 802.11 NULL-packets may be Block ACKnowledged by the destination radio to the source radio, so that the source radio can derive statistics of throughput, PER, latency, and/or spectrum busyness. Another traffic test, comprising of a sequence of zero-byte length field 802.11 NULL-packets, transmitted using 802.11 MU-MIMO protocols with from a source radio to a plurality of destination radios, and which are individually block ACKnowledged by the destination radios to the source radio, so that the source radio can derive statistics of throughput, PER, latency, and/or spectrum busyness independently for the application of MU-MIMO.

Indeed, a method for improving signal reception in an access point may comprise the steps of: transmitting a zero-byte length 802.11 NULL-data packets to a client, wherein the traffic test is initiated at a predetermined interval; receiving an 802.11 ACKnowledgement packet from the client wherein the 802.11 ACKnowledgement packet indicates that the packet was received by the client; and processing the ACKnowledgement statistics to determine at least one of Mbps throughput, PER, packet latency, and/or spectrum busyness for the specific client tested, where the NULL-packets may comprise zero-byte and/or non-zero-byte length packets. The predetermined interval may be between 0.01 and 60 seconds, preferably between 10 and 40 seconds, and even more preferably approximately 20 seconds. In certain aspects, however, the intervals may not be regular; rather, the interval may be variable.

Throughput of a network refers to the average rate of successful message delivery over a communication channel. The throughput is usually measured in bits per second (bit/s or bps), and sometimes in data packets per second or data packets per time slot. The PER refers to the number of incorrectly received data packets divided by the total number of received packets. In general, a packet is declared incorrect if at least one bit is erroneous. The expectation value of the PER is denoted packet error probability, which for a data packet length of N bits can be expressed as Equation 1. Assuming that the bit errors are independent of each other. For small bit error probabilities, this is approximately Equation 2. Similar measurements can be carried out for the transmission of frames, blocks, or symbols.

$$p_p = 1-(1-p_e)^N \quad \text{(Equation 1)}$$

$$p_p \approx p_e N \quad \text{(Equation 2)}$$

Network latency in a packet-switched network may be measured either one-way (the time from the source sending a packet to the destination receiving it), or round-trip (the one-way latency from source to destination plus the one-way latency from the destination back to the source). A ping may also be used to measure round-trip latency. A ping does not perform packet processing, but rather sends a response back when the client receives a packet, (e.g., performs a no-operation), thus it is a relatively accurate way of measuring latency.

Another method for improving signal reception in an access point may comprise the steps of: transmitting a zero-byte length 802.11 aggregated NULL-data packets to a client, wherein the traffic test is initiated at a predetermined interval; receiving an 802.11 Block ACKnowledgement packet from the client wherein the 802.11 ACKnowledgement packet indicates that the packet was received by the client; and processing the Block ACKnowledgement statistics to determine at least one of Mbps throughput, PER, packet latency, and/or spectrum busyness for the specific client tested, where the aggregated NULL-packets may comprise zero-byte and/or non-zero-byte length packets.

A method for improving signal reception in an access point comprising the steps of: transmitting a zero-byte length 802.11 NULL-data packets to a plurality of clients using MU-MIMO, wherein the traffic test is initiated at a predetermined interval; receiving an 802.11 ACKnowledgement packet from each client wherein the 802.11 ACKnowledgement packet indicates that the packet was received by the client; and processing the 802.11 ACKnowledgement statistics to determine at least one of Mbps throughput, PER, packet latency, and/or spectrum busyness for the specific client tested, where the NULL-packets may comprise zero-byte and/or non-zero-byte length packets.

A method for estimating the SLA or SLT of an AP or network of APs by transmitting a plurality of zero-byte length or non-zero-byte length NULL-packets which are sent individually, or using 802.11 packet aggregation, to a single client, or a plurality of clients, using 802.11 or using MU-MIMO, and where the ACKnowledgement packets are used to derive network level statistics, where the packet statistics may be used by a SON algorithm to: determine optimal channel selection; determine maximum theoretical throughput of a high capacity venue, such as a stadium; and/or optimize the operation of a MU-MIMO scheduling algorithm.

In certain aspects, the methods above may be used to collect at least one of Mbps, RSSI, QoS setting, data-packet length, number of packet transmissions, number of packet retransmissions, transmitter efficiency, transmitter hold-off times, number of dropped packets, and client type derived from the Ethernet MAC OUI. Moreover, in certain aspects, the methods above may be selectively enabled and disabled by, for example, an operator. In other aspects, the methods above may be continuously operating as a background operation of an access point, group of access points, or a complete network. The methods above may be used as a means of continuous network monitoring, or as a method of comparative testing of a current software release with a new software release to verify the anticipated improvements in network performance.

The above-cited patents and patent publications are hereby incorporated by reference in their entireties herein. Although various embodiments have been described with reference to a particular arrangement of parts, features and the like, these are not intended to exhaust all possible arrangements or features, and indeed many other embodiments, modifications, and variations will be ascertainable to those of skill in the art. Thus, it is to be understood that the invention may therefore be practiced otherwise than as specifically described above.

What is claimed is:

1. A system for improving signal reception in an access point comprising:
    a client device; and
    an access point, wherein the access point is communicatively coupled with the client device, the client device being configured to:
    (1) receive from the access point an 802.11 NULL-packet having a type field indicative of a null function and a non-zero byte length field;
    (2) transmit an ACKnowledgement packet to the access point indicating that the 802.11 NULL-packet was received by the client device; and
    (3) discard the 802.11 NULL-packet after transmitting the ACKnowledgement packet.

2. The system of claim 1, wherein the client device discards the 802.11 NULL-packet via the client device MAC layer.

3. The system of claim 1, wherein the 802.11 NULL-packet is one of an IEEE 802.11a NULL-packet, an IEEE 802.11b NULL-packet, an IEEE 802.11g NULL-packet, an IEEE 802.11n NULL-packet and an IEEE 802.11ac NULL-packet.

4. A method for testing data traffic, the method comprising:
    transmitting from a source radio to a destination radio a plurality of 802.11 NULL-packets, each including a type field indicative of a null function, wherein the plurality of 802.11 NULL-packets includes at least one non-zero byte length field 802.11 NULL-packet;
    receiving, from the destination radio, an ACKnowledgement packet for at least one of the plurality of 802.11 NULL-packets; and
    determining statistics for the source radio using the ACKnowledgement packet.

5. The method of claim 4, wherein receiving comprises receiving, from the destination radio, an ACKnowledgement packet for each one of the plurality of 802.11 NULL-packets transmitted.

6. The method of claim 4, wherein receiving comprises receiving, from the destination radio, a block ACKnowledgement packet for two or more of the plurality of 802.11 NULL-packets transmitted.

7. The method of claim 4, wherein the statistics relate to at least one of a throughput, a packet error rate, a latency, a spectrum busyness.

8. The method of claim 4, wherein the plurality of 802.11 NULL-packets comprises zero-byte length field NULL-packets and non-zero-byte length field NULL-packets.

9. The method of claim 4, wherein one or more of the plurality of 802.11 NULL-packets are transmitted using 802.11n packet aggregation.

10. The method of claim 4, wherein one or more of the plurality of 802.11 NULL-packets are transmitted to a plurality of destination radios using a 802.11 Multi-User Multiple-Input and Multiple-Output protocol.

11. A method for improving signal reception in an access point, the method comprising the steps of:
   transmitting to a client a plurality of 802.11 NULL-packets at a predetermined interval, each 801.11 NULL-packet including a type field indicative of a null function, wherein at least one of the plurality of 802.11 NULL-packets has a non-zero-byte length;
   receiving an 802.11 ACKnowledgement packet from the client, wherein said 802.11 ACKnowledgement packet indicates that an 802.11 NULL-packet was received by the client; and
   using 802.11 ACKnowledgement statistics to determine at least one of a throughput, a packet error rate, a packet latency, spectrum busyness for the client.

12. The method of claim 11, wherein the plurality of 802.11 NULL-packets comprises zero-byte length field NULL-packets and non-zero-byte length field NULL-packets.

13. A method for improving signal reception in an access point, the method comprising the steps of:
   transmitting to a client a plurality of 802.11 aggregated NULL-packets at a predetermined interval, each 802.11 aggregated NULL-packet including a type field indicative of a null function, wherein at least one of said plurality of 802.11 aggregated NULL-packets has a non-zero-byte length,
   receiving an 802.11 block ACKnowledgement packet from the client wherein the 802.11 block ACKnowledgement packet indicates that two or more 802.11 aggregated NULL-packets were received by the client; and
   using 802.11 block ACKnowledgement statistics to determine at least one of a throughput, a packet error rate, a packet latency, and a spectrum busyness for the client.

14. The method of claim 13, wherein the plurality of 802.11 aggregated NULL-packets comprises zero-byte length field NULL-packets and non-zero-byte length field NULL-packets.

15. A method for improving signal reception in an access point, the method comprising the steps of:
   transmitting a plurality of 802.11 NULL-packets each including a type field indicative of a null function to a plurality of clients using a Multi-User Multiple-Input and Multiple-Output protocol, wherein at least one of the plurality of 802.11 NULL-packets has a non-zero-byte length,
   receiving an 802.11 ACKnowledgement packet from each client wherein the 802.11 ACKnowledgement packet indicates that a 802.11 NULL-packet was received by the client, and
   using 802.11 ACKnowledgement statistics to determine at least one of a throughput, a packet error rate, a packet latency and spectrum busyness for each client.

16. The method of claim 15, wherein the plurality of 802.11 NULL-packets comprises both zero-byte length field NULL-packets and non-zero-byte length field NULL-packets.

17. The method of claim 15, wherein the plurality of 802.11 NULL-packets comprises both aggregated zero-byte length field NULL-packets and aggregated non-zero-byte length field NULL-packets.

18. A method for estimating a service level target for one or more Access Points, the method comprising the steps of:
   transmitting to one or more clients a plurality of 802.11 NULL-packets each including a type field indicative of a null function, wherein at least one of the plurality of 802.11 NULL-packets has a non-zero-byte length;
   receiving a plurality of ACKnowledgement packets; and
   using said plurality of ACKnowledgement packets to derive network level statistics associated with the service level target.

19. The method of claim 18, wherein the network level statistics are used by a Self Optimizing Network (SON) algorithm to determine an optimal channel selection.

20. The method of claim 18, wherein the network level statistics are used to determine a maximum throughput of a high capacity venue.

21. The method of claim 18, wherein the network level statistics are used to optimize the operation of a Multi-User Multiple-Input and Multiple-Output scheduling algorithm.

* * * * *

UNITED STATES PATENT AND TRADEMARK OFFICE
CERTIFICATE OF CORRECTION

Page 1 of 2

PATENT NO. : 9,462,485 B2
APPLICATION NO. : 13/847227
DATED : October 4, 2016
INVENTOR(S) : Russell et al.

It is certified that error appears in the above-identified patent and that said Letters Patent is hereby corrected as shown below:

On the Title Page

Item (73), under "Assignee", in Column 1, Line 1, delete "Telefonaktiebolaget L M Ericsson," and insert -- Telefonaktiebolaget L M Ericsson (Publ), --, therefor.

In the Drawings

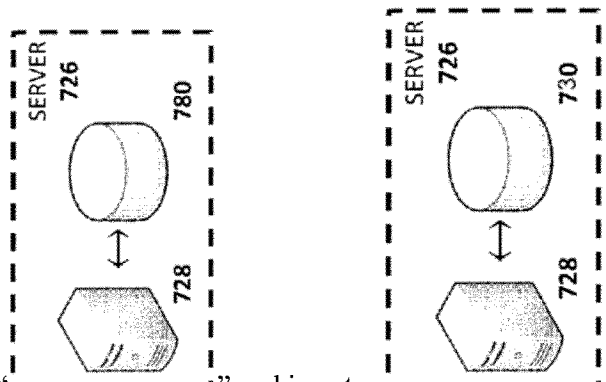

In Fig. 7a, Sheet 9 of 12, delete "          " and insert --          --, therefor.

In the Specification

In Column 3, Line 38, delete "FIGS. 6a-6c, illustrate" and insert -- FIGS. 6a-6c illustrate --, therefor.

In Column 4, Line 10, delete "Medium Access (MAC)" and insert -- Medium Access Control (MAC) --, therefor.

In Column 6, Line 59, delete "etc.)" and insert -- etc. --, therefor.

In Column 10, Line 11, delete "step 806," and insert -- step 804, --, therefor.

Signed and Sealed this
Twenty-ninth Day of December, 2020

Andrei Iancu
*Director of the United States Patent and Trademark Office*

CERTIFICATE OF CORRECTION (continued)
U.S. Pat. No. 9,462,485 B2

In Column 10, Lines 14-15, delete "step 803" and insert -- step 802 --, therefor.

In the Claims

In Column 13, Line 47, in Claim 13, delete "length," and insert -- length; --, therefor.